United States Patent
Yerramalli et al.

(10) Patent No.: US 9,762,361 B2
(45) Date of Patent: Sep. 12, 2017

(54) TIMER CONFIGURATION FOR SECONDARY CELLS IN LTE/LTE-A NETWORKS USING UNLICENSED SPECTRUM

(71) Applicant: QUALCOMM Incorporated, San Deigo, CA (US)

(72) Inventors: Srinivas Yerramalli, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/618,606

(22) Filed: Feb. 10, 2015

(65) Prior Publication Data

US 2015/0256305 A1   Sep. 10, 2015

Related U.S. Application Data

(60) Provisional application No. 61/948,440, filed on Mar. 5, 2014.

(51) Int. Cl.
*H04L 5/00* (2006.01)
*H04W 72/04* (2009.01)
(Continued)

(52) U.S. Cl.
CPC ........ *H04L 5/0032* (2013.01); *H04J 11/0059* (2013.01); *H04L 5/0098* (2013.01);
(Continued)

(58) Field of Classification Search
CPC ............ H04L 5/0098; H04W 74/0808; H04W 74/0816; H04W 74/0825; H04W 76/066; H04W 76/068
See application file for complete search history.

(56) References Cited

U.S. PATENT DOCUMENTS

| | | | |
|---|---|---|---|
| 2013/0010641 A1* | 1/2013 | Dinan | H04W 36/0072 370/254 |
| 2015/0043405 A1 | 2/2015 | Uchino et al. | |

(Continued)

FOREIGN PATENT DOCUMENTS

| | | |
|---|---|---|
| GB | 2498988 A | 8/2013 |
| WO | WO-2013137207 A1 | 9/2013 |

OTHER PUBLICATIONS

Nokia Siemens Networks, "On the possibility for implicit release of activated secondary component carriers", 3GPP TSG-RAN WG2 Meeting #69, R2-101077.*

(Continued)

*Primary Examiner* — Jamal Javaid
(74) *Attorney, Agent, or Firm* — Liem T. Do

(57) ABSTRACT

Configuration of secondary cell timers is disclosed for long term evolution (LTE)/LTE-Advanced (LTE-A) having unlicensed spectrum. In order to save power at a user equipment (UE), secondary cells may be deactivated by configuring a secondary cell deactivation timer. Because of transmission uncertainties when operating in LTE/LTE-A systems having unlicensed spectrum, the deactivation timers for unlicensed spectrum may be provided in a clear channel assessment (CCA)-dependent configuration, a CCA-independent configuration, or an alternative threshold-driven configuration of both CCA-dependent and CCA-independent configurations.

16 Claims, 13 Drawing Sheets

(51) Int. Cl.
*H04W 52/02* (2009.01)
*H04J 11/00* (2006.01)
*H04W 76/06* (2009.01)

(52) U.S. Cl.
CPC ... *H04W 52/0216* (2013.01); *H04W 72/0426* (2013.01); *H04W 72/0446* (2013.01); *H04W 76/068* (2013.01); *Y02B 60/50* (2013.01)

(56) References Cited

U.S. PATENT DOCUMENTS

| | | | |
|---|---|---|---|
| 2015/0049739 A1* | 2/2015 | Lee | H04W 56/0045 370/336 |
| 2015/0245219 A1* | 8/2015 | Wei | H04W 16/14 370/336 |

OTHER PUBLICATIONS

International Search Report and Written Opinion—PCT/US2015/015359—ISA/EPO—Jun. 1, 2015.

Nokia Siemens Networks, et al., "On the possibility for implicit release of activated secondary component carriers", 3GPP Draft; R2-101077 CC Implicit Release, 3rd Generation Partnership Project (3GPP), Mobile Competence Centre; 650, Route Des Lucioles F-06921 Sophia Antipolis Cedex; France, TSG-RAN WG2, no. San Francisco, USA, Feb. 22, 2010, XP050421743, 2 Pages. [retrieved on Feb. 16, 2010).

* cited by examiner

TIMER CONFIGURATION FOR SECONDARY CELLS IN LTE/LTE-A NETWORKS USING UNLICENSED SPECTRUM

CROSS-REFERENCE TO RELATED APPLICATIONS

This application claims the benefit of U.S. Provisional Patent Application No. 61/948,440, entitled, "TIMER CONFIGURATION FOR SECONDARY CELLS IN LTE/LTE-A NETWORKS USING UNLICENSED SPECTRUM", filed on Mar. 5, 2014, which is expressly incorporated by reference herein in its entirety.

BACKGROUND

Field

Aspects of the present disclosure relate generally to wireless communication systems, and more particularly, to timer configuration for secondary cells in long term evolution (LTE)/LTE-Advanced (LTE-A) networks using unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving configuration of a duration for a deactivation timer for a secondary cell associated with a UE, detecting a channel reserving signal over the secondary cell from a serving base station, and initiating the deactivation timer in response to the channel reserving signal.

In an additional aspect of the disclosure, a method of wireless communication includes transmitting configuration of a duration for a deactivation timer for a secondary cell associated with a UE, detecting a successful clear channel assessment (CCA) check of the secondary cell for transmission to the UE, and initiating a deactivation timer for the secondary cell, in response to detecting the successful CCA check.

In an additional aspect of the disclosure, a method of wireless communication includes receiving configuration of a duration for a deactivation timer for a secondary cell associated with a UE, determining that the secondary cell is on unlicensed spectrum, reconfiguring the deactivation timer for the secondary cell to an unlicensed spectrum duration, and initiating the deactivation timer after the reconfiguring.

In an additional aspect of the disclosure, a method of wireless communication includes transmitting configuration of a duration for a deactivation timer for a secondary cell associated with a UE, determining that the secondary cell is on unlicensed spectrum, reconfiguring the deactivation timer for the secondary cell to an unlicensed spectrum duration, and initiating the deactivation timer after the reconfiguring.

In an additional aspect of the disclosure, a method of wireless communication includes receiving configuration of a duration for a deactivation timer for a secondary cell associated with a UE, selecting a CCA-dependent deactivation timer configuration in response to the duration being below a threshold, selecting a CCA-independent deactivation timer configuration in response to the duration being above the threshold, and initiating a deactivation timer according to the selected deactivation timer configuration.

In an additional aspect of the disclosure, a method of wireless communication includes transmitting configuration of a duration for a deactivation timer for a secondary cell associated with a UE, identifying a CCA-dependent deactivation timer configuration for the UE in response to the duration being below a threshold, identifying a CCA-independent deactivation timer configuration for the UE in response to the duration being above the threshold, and initiating a deactivation timer according to the identified deactivation timer configuration.

In an additional aspect of the disclosure, a method of wireless communication includes receiving an indication from a serving base station identifying a deactivation timer scheme to apply at a UE, wherein the deactivation timer scheme includes either a CCA-dependent deactivation timer configuration, a CCA-independent deactivation timer configuration, or a hybrid CCA-dependent/CCA-independent deactivation timer configuration. The method further includes receiving configuration of a duration for a deactivation timer for a secondary cell associated with the UE and initiating a deactivation timer according to the identified deactivation timer scheme.

In an additional aspect of the disclosure, a method of wireless communication includes transmitting an indication to a UE identifying a deactivation timer scheme to apply at the UE, wherein the deactivation timer scheme includes either a CCA-dependent deactivation timer configuration, a CCA-independent deactivation timer configuration, or a hybrid CCA-dependent/CCA-independent deactivation timer configuration. The method further includes transmitting configuration of a duration for a deactivation timer for a secondary cell associated with the UE and initiating a deactivation timer according to the identified deactivation timer scheme.

In an additional aspect of the disclosure, a method of wireless communication includes receiving an uplink grant for an unlicensed secondary cell, performing a CCA check on the unlicensed secondary cell in preparation for uplink transmission, deactivating the unlicensed secondary cell in response to either failure to detect a clear CCA check for accessing the unlicensed secondary cell for a duration of radio frames, when the uplink grant is received in each of the duration of radio frames via cross-carrier scheduling, failure to detect the clear CCA check for accessing the unlicensed secondary cell for the duration of radio frames, when the uplink grant is received via the unlicensed secondary cell and downlink transmission are detected by a UE on the unlicensed secondary cell, or failure to detect downlink transmissions on the unlicensed secondary cell.

In an additional aspect of the disclosure, a method of wireless communication includes periodically receiving a CCA-exempt transmission (CET) from a transmitter over an unlicensed carrier, and, in response to failing to decode the CET a predetermined number of consecutive times, transmitting a message to the transmitter via an accessible carrier different from the unlicensed carrier, and deactivating the unlicensed carrier.

In an additional aspect of the disclosure, an apparatus configured for wireless communication includes means for receiving configuration of a duration for a deactivation timer for a secondary cell associated with a UE, means for detecting a channel reserving signal over the secondary cell from a serving base station, and means for initiating the deactivation timer in response to the channel reserving signal.

In an additional aspect of the disclosure, an apparatus configured for wireless communication includes means for transmitting configuration of a duration for a deactivation timer for a secondary cell associated with a UE, means for detecting a successful CCA check of the secondary cell for transmission to the UE, and means for initiating a deactivation timer for the secondary cell, in response to detecting the successful CCA check.

In an additional aspect of the disclosure, an apparatus configured for wireless communication includes means for receiving configuration of a duration for a deactivation timer for a secondary cell associated with the UE, means for determining that the secondary cell is on unlicensed spectrum, means for reconfiguring the deactivation timer for the secondary cell to an unlicensed spectrum duration, and means for initiating the deactivation timer after the reconfiguring.

In an additional aspect of the disclosure, an apparatus configured for wireless communication includes means for transmitting configuration of a duration for a deactivation timer for a secondary cell associated with a UE, means for determining that the secondary cell is on unlicensed spectrum, means for reconfiguring the deactivation timer for the secondary cell to an unlicensed spectrum duration, and means for initiating the deactivation timer after the reconfiguring.

In an additional aspect of the disclosure, an apparatus configured for wireless communication includes means for receiving configuration of a duration for a deactivation timer for a secondary cell associated with the UE, means for selecting a CCA-dependent deactivation timer configuration in response to the duration being below a threshold, means for selecting a CCA-independent deactivation timer configuration in response to the duration being above the threshold, and means for initiating a deactivation timer according to the selected deactivation timer configuration.

In an additional aspect of the disclosure, an apparatus configured for wireless communication includes means for transmitting configuration of a duration for a deactivation timer for a secondary cell associated with a UE, means for identifying a CCA-dependent deactivation timer configuration for the UE in response to the duration being below a threshold, means for identifying a CCA-independent deactivation timer configuration for the UE in response to the duration being above the threshold, and means for initiating a deactivation timer according to the identified deactivation timer configuration.

In an additional aspect of the disclosure, an apparatus configured for wireless communication includes means for receiving an indication from a serving base station identifying a deactivation timer scheme to apply at a UE, wherein the deactivation timer scheme includes either a CCA-dependent deactivation timer configuration, a CCA-independent deactivation timer configuration, or a hybrid CCA-dependent/CCA-independent deactivation timer configuration. The apparatus further includes means for receiving configuration of a duration for a deactivation timer for a secondary cell associated with the UE and means for initiating a deactivation timer according to the identified deactivation timer scheme.

In an additional aspect of the disclosure, an apparatus configured for wireless communication includes means for transmitting an indication to a UE identifying a deactivation timer scheme to apply at the UE, wherein the deactivation timer scheme includes either a CCA-dependent deactivation timer configuration, a CCA-independent deactivation timer configuration, or a hybrid CCA-dependent/CCA-independent deactivation timer configuration. The apparatus further includes means for transmitting configuration of a duration for a deactivation timer for a secondary cell associated with the UE and means for initiating a deactivation timer according to the identified deactivation timer scheme.

In an additional aspect of the disclosure, an apparatus configured for wireless communication includes means for receiving an uplink grant for an unlicensed secondary cell, means for performing a CCA check on the unlicensed secondary cell in preparation for uplink transmission, means for deactivating the unlicensed secondary cell in response to either: failure to detect a clear CCA check for accessing the unlicensed secondary cell for a duration of radio frames, when the uplink grant is received in each of the duration of radio frames via cross-carrier scheduling, failure to detect the clear CCA check for accessing the unlicensed secondary cell for the duration of radio frames, when the uplink grant is received via the unlicensed secondary cell and downlink transmission are detected by the UE on the unlicensed secondary cell, or failure to detect downlink transmissions on the unlicensed secondary cell.

In an additional aspect of the disclosure, an apparatus configured for wireless communication includes means for periodically receiving a CET from a transmitter over an unlicensed carrier, and, means, executable in response to failing to decode the CET a predetermined number of consecutive times, for transmitting, by the receiver, a message to the transmitter via an accessible carrier different from the unlicensed carrier, and for deactivating the unlicensed carrier.

In an additional aspect of the disclosure, a non-transitory computer-readable medium having program code recorded thereon. This program code includes code to receive configuration of a duration for a deactivation timer for a secondary cell associated with a UE, code to detect a channel reserving signal over the secondary cell from a serving base station, and code to initiate the deactivation timer in response to the channel reserving signal.

In an additional aspect of the disclosure, a non-transitory computer-readable medium having program code recorded thereon. This program code includes code to transmit configuration of a duration for a deactivation timer for a secondary cell associated with a UE, code to detect a successful CCA check of the secondary cell for transmission to the UE, and code to initiate a deactivation timer for the secondary cell, in response to detecting the successful CCA check.

In an additional aspect of the disclosure, a non-transitory computer-readable medium having program code recorded thereon. This program code includes code to receive configuration of a duration for a deactivation timer for a secondary cell associated with a UE, code to determine that the secondary cell is on unlicensed spectrum, code to reconfigure the deactivation timer for the secondary cell to an unlicensed spectrum duration, and code to initiate the deactivation timer after the reconfiguring.

In an additional aspect of the disclosure, a non-transitory computer-readable medium having program code recorded thereon. This program code includes code to transmit configuration of a duration for a deactivation timer for a secondary cell associated with a UE, code to determine that the secondary cell is on unlicensed spectrum, code to reconfigure the deactivation timer for the secondary cell to an unlicensed spectrum duration, and code to initiate the deactivation timer after the reconfiguring.

In an additional aspect of the disclosure, a non-transitory computer-readable medium having program code recorded thereon. This program code includes code to receive configuration of a duration for a deactivation timer for a secondary cell associated with a UE, code to select a CCA-dependent deactivation timer configuration in response to the duration being below a threshold, code to select a CCA-independent deactivation timer configuration in response to the duration being above the threshold, and code to initiate a deactivation timer according to the selected deactivation timer configuration.

In an additional aspect of the disclosure, a non-transitory computer-readable medium having program code recorded thereon. This program code includes code to transmit configuration of a duration for a deactivation timer for a secondary cell associated with a UE, code to identify a CCA-dependent deactivation timer configuration for the UE in response to the duration being below a threshold, code to identify a CCA-independent deactivation timer configuration for the UE in response to the duration being above the threshold, and code to initiate a deactivation timer according to the identified deactivation timer configuration.

In an additional aspect of the disclosure, a non-transitory computer-readable medium having program code recorded thereon. This program code includes code to receive an indication from a serving base station identifying a deactivation timer scheme to apply at a UE, wherein the deactivation timer scheme includes either a CCA-dependent deactivation timer configuration, a CCA-independent deactivation timer configuration, or a hybrid CCA-dependent/CCA-independent deactivation timer configuration. The computer program product further includes code to receive configuration of a duration for a deactivation timer for a secondary cell associated with the UE and code to initiate a deactivation timer according to the identified deactivation timer scheme.

In an additional aspect of the disclosure, a non-transitory computer-readable medium having program code recorded thereon. This program code includes code to transmit an indication to a UE identifying a deactivation timer scheme to apply at the UE, wherein the deactivation timer scheme includes either a CCA-dependent deactivation timer configuration, a CCA-independent deactivation timer configuration, or a hybrid CCA-dependent/CCA-independent deactivation timer configuration. The computer program product further includes code to transmit configuration of a duration for a deactivation timer for a secondary cell associated with the UE and code to initiate a deactivation timer according to the identified deactivation timer scheme.

In an additional aspect of the disclosure, a non-transitory computer-readable medium having program code recorded thereon. This program code includes code to receive an uplink grant for an unlicensed secondary cell, code to perform a CCA check on the unlicensed secondary cell in preparation for uplink transmission, code to deactivate the unlicensed secondary cell in response to either failure to detect a clear CCA check for accessing the unlicensed secondary cell for a duration of radio frames, when the uplink grant is received in each of the duration of radio frames via cross-carrier scheduling, failure to detect the clear CCA check for accessing the unlicensed secondary cell for the duration of radio frames, when the uplink grant is received via the unlicensed secondary cell and downlink transmission are detected by a UE on the unlicensed secondary cell, or failure to detect downlink transmissions on the unlicensed secondary cell.

In an additional aspect of the disclosure, a non-transitory computer-readable medium having program code recorded thereon. This program code includes code to periodically receive a CET from a transmitter over an unlicensed carrier, and, executable in response to failing to decode the CET a predetermined number of consecutive times, code to transmit a message to the transmitter via an accessible carrier different from the unlicensed carrier, and code to deactivate the unlicensed carrier.

In an additional aspect of the disclosure, an apparatus includes at least one processor and a memory coupled to the processor. The processor is configured to receive configuration of a duration for a deactivation timer for a secondary cell associated with a UE, to detect a channel reserving signal over the secondary cell from a serving base station, and to initiate the deactivation timer in response to the channel reserving signal.

In an additional aspect of the disclosure, an apparatus includes at least one processor and a memory coupled to the processor. The processor is configured to transmit configuration of a duration for a deactivation timer for a secondary cell associated with a UE, to detect a successful CCA check of the secondary cell for transmission to the UE, and to initiate a deactivation timer for the secondary cell, in response to detecting the successful CCA check.

In an additional aspect of the disclosure, an apparatus includes at least one processor and a memory coupled to the processor. The processor is configured to receive configuration of a duration for a deactivation timer for a secondary cell associated with a UE, to determine that the secondary cell is on unlicensed spectrum, to reconfigure the deactivation timer for the secondary cell to an unlicensed spectrum duration, and to initiate the deactivation timer after the reconfiguring.

In an additional aspect of the disclosure, an apparatus includes at least one processor and a memory coupled to the processor. The processor is configured to transmit configuration of a duration for a deactivation timer for a secondary cell associated with a UE, to determine that the secondary cell is on unlicensed spectrum, to reconfigure the deactivation timer for the secondary cell to an unlicensed spectrum duration, and to initiate the deactivation timer after the reconfiguring.

In an additional aspect of the disclosure, an apparatus includes at least one processor and a memory coupled to the processor. The processor is configured to receive configuration of a duration for a deactivation timer for a secondary cell associated with a UE, to select a CCA-dependent deactivation timer configuration in response to the duration being below a threshold, to select a CCA-independent deactivation timer configuration in response to the duration being above the threshold, and to initiate a deactivation timer according to the selected deactivation timer configuration.

In an additional aspect of the disclosure, an apparatus includes at least one processor and a memory coupled to the processor. The processor is configured to transmit configuration of a duration for a deactivation timer for a secondary cell associated with a UE, to identify a CCA-dependent deactivation timer configuration for the UE in response to the duration being below a threshold, to identify a CCA-independent deactivation timer configuration for the UE in response to the duration being above the threshold, and to initiate a deactivation timer according to the identified deactivation timer configuration.

In an additional aspect of the disclosure, an apparatus includes at least one processor and a memory coupled to the processor. The processor is configured to receive an indication from a serving base station identifying a deactivation timer scheme to apply at a UE, wherein the deactivation timer scheme includes either a CCA-dependent deactivation timer configuration, a CCA-independent deactivation timer configuration, or a hybrid CCA-dependent/CCA-independent deactivation timer configuration. The configuration of the at least one processor further includes configuration to receive configuration of a duration for a deactivation timer for a secondary cell associated with the UE and to initiate a deactivation timer according to the identified deactivation timer scheme.

In an additional aspect of the disclosure, an apparatus includes at least one processor and a memory coupled to the processor. The processor is configured to transmit an indication to a UE identifying a deactivation timer scheme to apply at the UE, wherein the deactivation timer scheme includes either a CCA-dependent deactivation timer configuration, a CCA-independent deactivation timer configuration, or a hybrid CCA-dependent/CCA-independent deactivation timer configuration. The configuration of the at least one processor further includes configuration to transmit configuration of a duration for a deactivation timer for a secondary cell associated with the UE and to initiate a deactivation timer according to the identified deactivation timer scheme.

In an additional aspect of the disclosure, an apparatus includes at least one processor and a memory coupled to the processor. The processor is configured to receive an uplink grant for an unlicensed secondary cell, to perform a CCA check on the unlicensed secondary cell in preparation for uplink transmission, to deactivate the unlicensed secondary cell in response to either failure to detect a clear CCA check for accessing the unlicensed secondary cell for a duration of radio frames, when the uplink grant is received in each of the duration of radio frames via cross-carrier scheduling, failure to detect the clear CCA check for accessing the unlicensed secondary cell for the duration of radio frames, when the uplink grant is received via the unlicensed secondary cell and downlink transmission are detected by a UE on the unlicensed secondary cell, or failure to detect downlink transmissions on the unlicensed secondary cell.

In an additional aspect of the disclosure, an apparatus includes at least one processor and a memory coupled to the processor. The processor is configured to periodically receive a CET from a transmitter over an unlicensed carrier, and, in response to failing to decode the CET a predetermined number of consecutive times, to transmit a message to the transmitter via an accessible carrier different from the unlicensed carrier, and to deactivate the unlicensed carrier.

DETAILED DESCRIPTION

Figure 1:
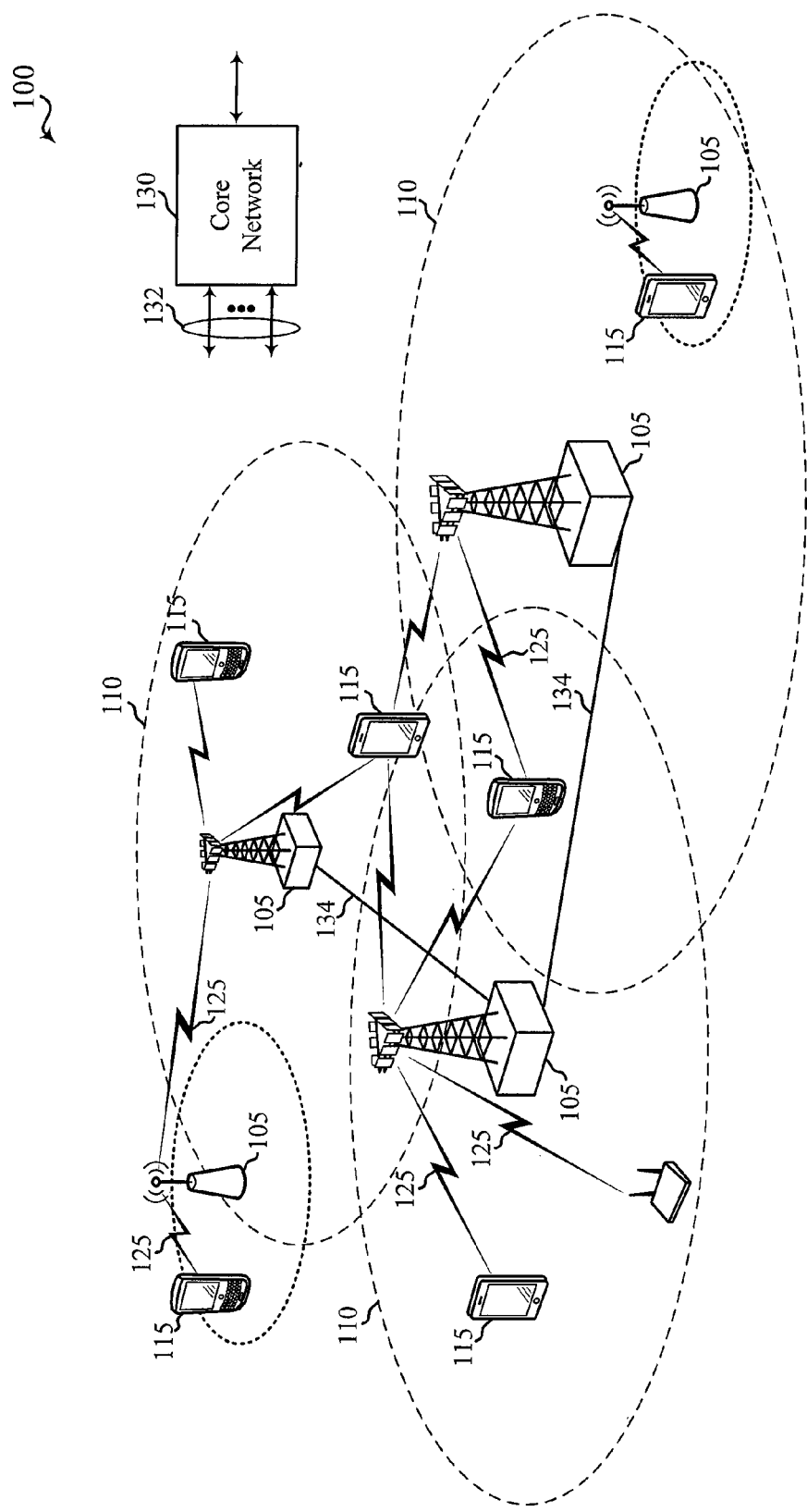
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A extending to unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., Si, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-13.

Figure 2A:
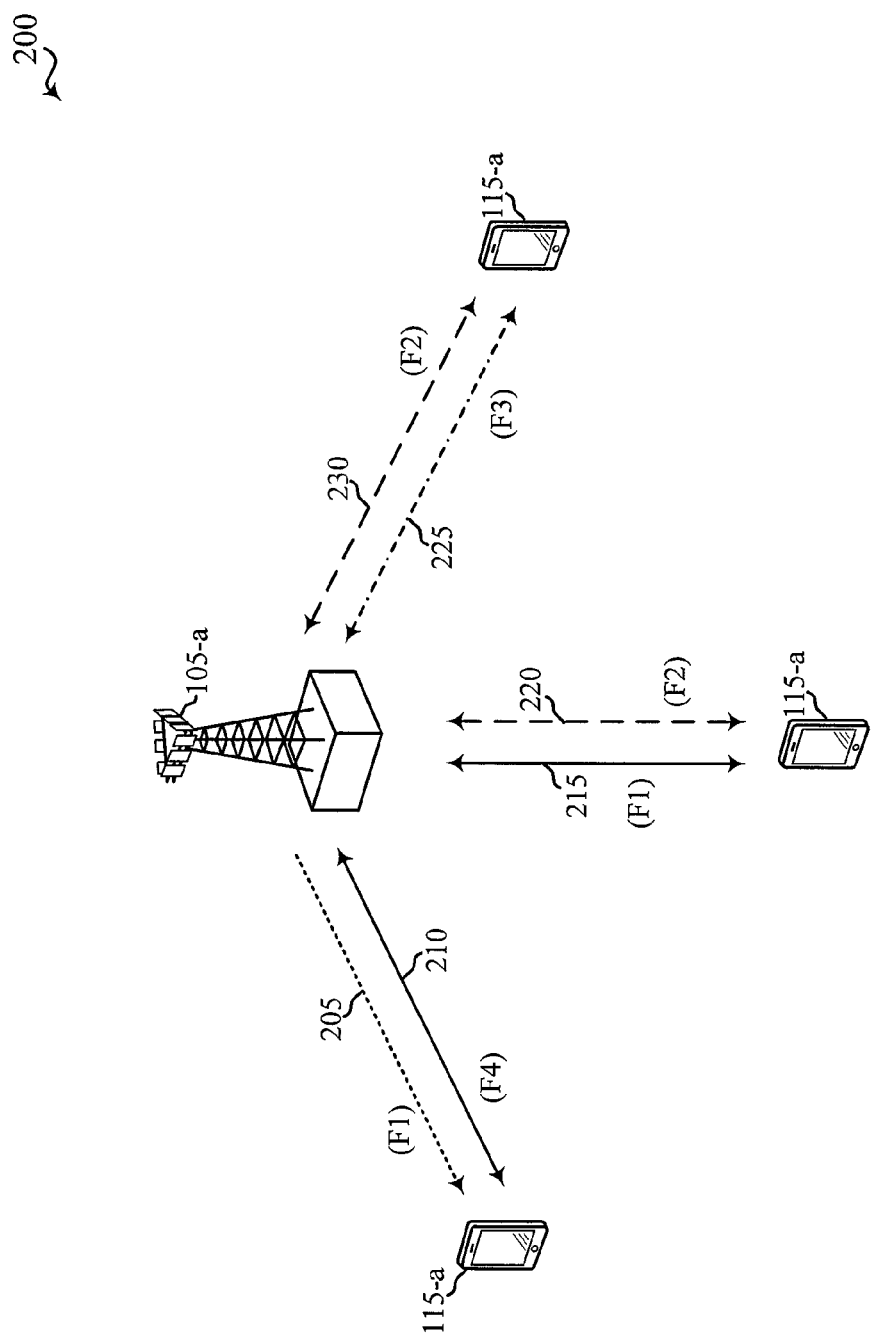
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
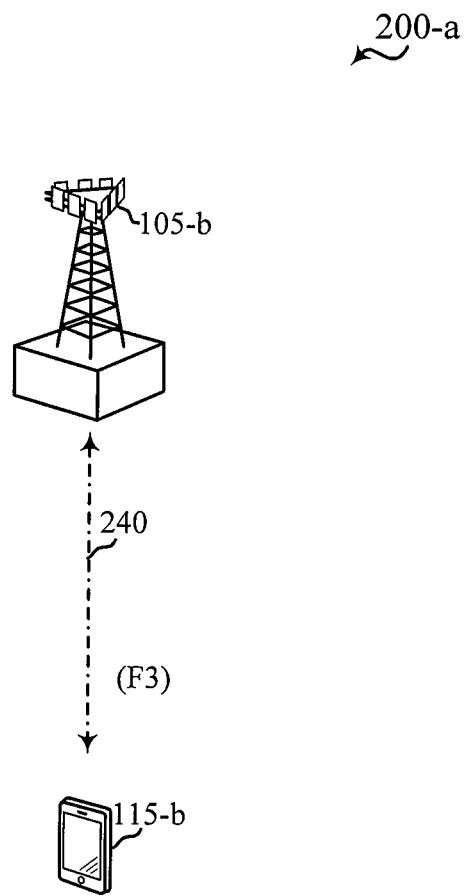
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
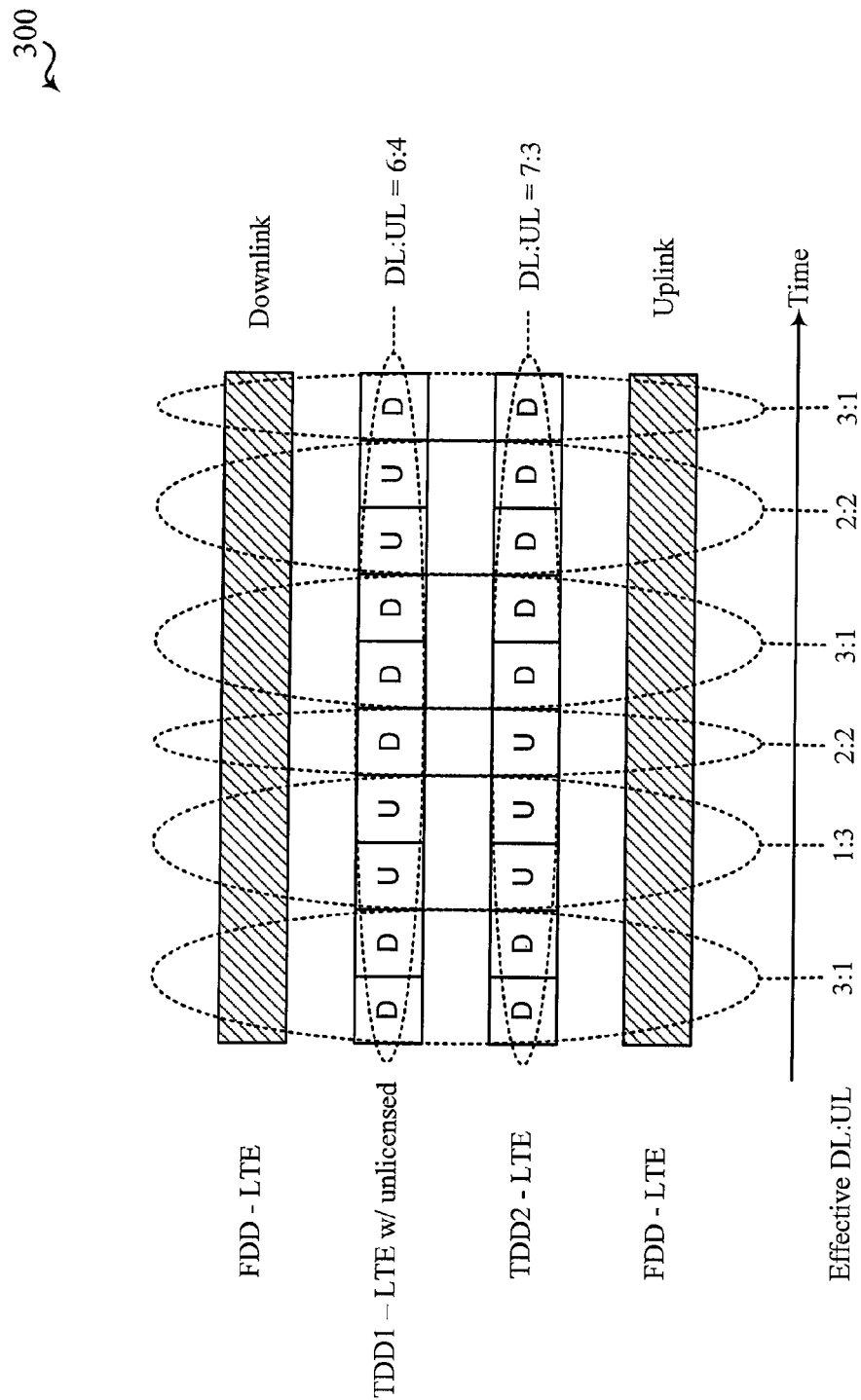
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
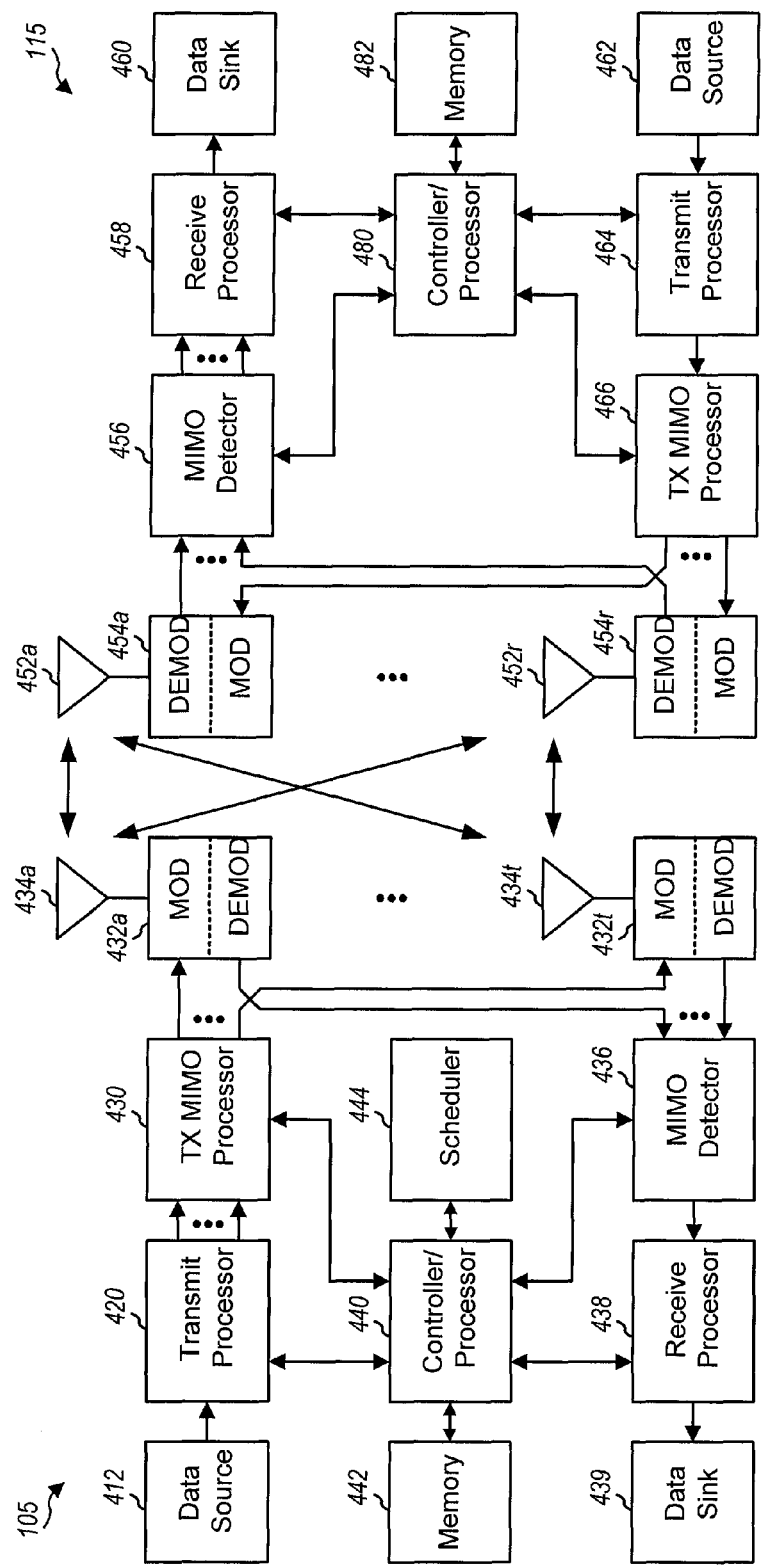
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434a through 434t, processed by the modulators 432a through 432t, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 6-11, and/or other processes for the techniques described herein. The memories 442 and 482 may store data and program codes for the eNB 105 and the UE 115, respectively. A scheduler 444 may schedule UEs for data transmission on the downlink and/or uplink.

In carrier aggregation functionality, secondary cells may be configured semi-statically by the base station using a RRC reconfiguration message. Activation and deactivation of the secondary cells may then be performed by a base station on a fast basis using media access control (MAC) control elements. Additionally, to save power at the UE, secondary cells may also be deactivated using a timer at the UE. By default, the timer may be set to infinity, but may be configured to be various radio frame lengths. For example, the timer may be set to one of 2, 4, 8, 16, 32, 64, or 128 radio frames. The UE will cease monitoring a secondary cell if no downlink grant is received for the secondary cell for the configured number of subframes. Aspects of the present disclosure provide for secondary cell deactivation timer configuration for LTE/LTE-A networks with unlicensed spectrum that takes into account the uncertainties of unlicensed spectrum transmissions.

Figure 5A:
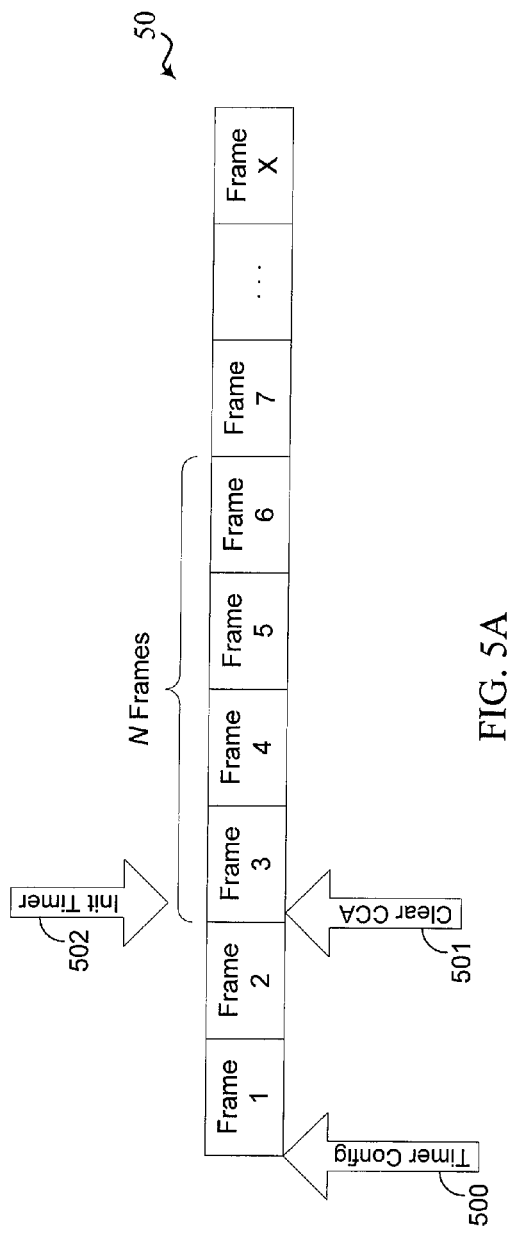
FIGS. 5A and 5B are transmission streams illustrating a series of transmission radio frames in communication systems configured according to aspects of the present disclosure.

In a first aspect of the disclosure, configuration of a deactivation timer may depend on CCA success. FIG. 5A is a block diagram illustrating a transmission stream 50 with a series of transmission radio frames 1-X in a communication system configured according to one aspect of the present disclosure. The deactivation timer of a UE within the system illustrated may be configured or set to a particular number of consecutive radio frames, N, when CCA success has been detected by a UE. For purposes of this example, the UE receives the configuration 500 of the deactivation timer at frame 1 configuring the timer for a duration of N radio frames. CCA success may be detected by detecting transmission of a channel reserving signal. When a base station or other transmitting node detects a successful CCA check, the base station will either immediately begin data transmissions or begin transmission of a signal that reserves the channel for the next radio frame. The channel reserving signal may be data transmissions, a channel usage beacon signal (CUBS), or other such signature signal from the base station that identifies the base station has been authorized for transmission on the channel (e.g., after a successful CCA). When the UE detects such a channel reserving signal, after detecting the clear CCA check at 501, the deactivation timer is initiated, at 502, for N consecutive radio frames, such that, when no data is scheduled for N consecutive radio frames after detecting the channel reserving signal, the UE deactivates the secondary cell. As illustrated, N has been selected by the serving base station as 4 radio frames. Thus, if the UE does not receive data scheduled over frames 3-6, then it will deactivate the secondary cell. However, the deactivation timer is dependent on detection of the successful CCA results. When the UE receives the timer configuration at frame 1, the timer does not begin until the first successful CCA is detected. With such CCA-dependent deactivation timer schemes, the timer duration may be configured for lower numbers of radio frames (e.g., 2, 4, and 8 radio frames).

It should be noted that data refers to the control channel data when self-scheduling is used for downlink grants, while data refers to the data channel data when cross-carrier scheduling is used for downlink grants.

Figures 6A, 6B:
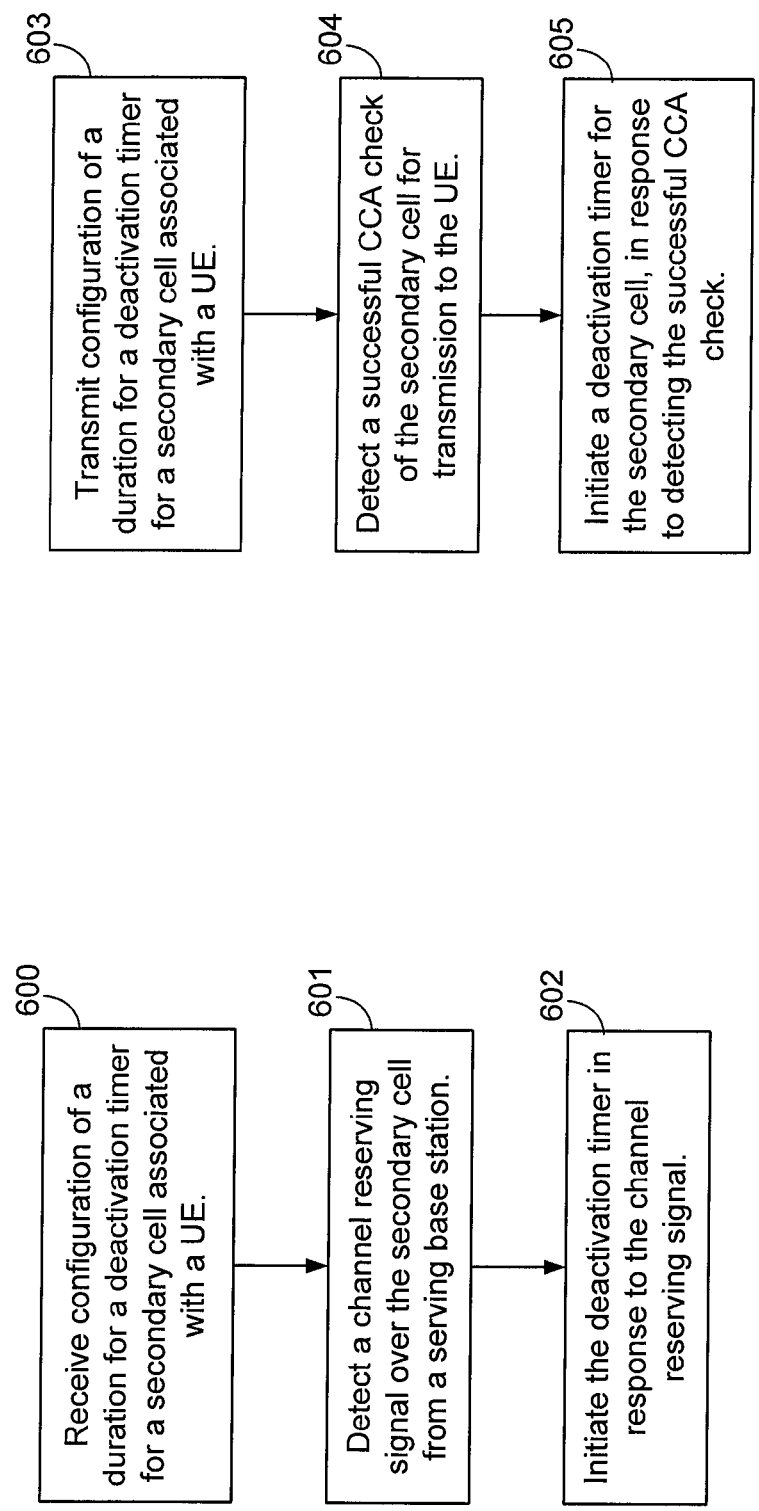
FIGS. 6A and 6B are functional block diagrams illustrating example blocks executed at a UE and base station to implement aspects of the present disclosure.

FIGS. 6A and 6B are functional block diagrams illustrating example blocks executed at a UE and a base station to implement an aspect of the present disclosure. At block 603, a serving base station transmits configuration of a duration for a deactivation timer for a secondary cell associated with a UE. At block 600, the UE receives this configuration of the deactivation timer and configures its deactivation timer accordingly. At block 601, the UE detects a channel reserving signal (e.g., CUBS, etc.) over the secondary cell from the serving base station and, at block 602, initiates the deactivation timer in response to the channel reserving signal. At block 604, the serving base station also detects a successful CCA on the secondary cell and, at block 605, initiates a parallel deactivation timer associated with the secondary cell for the UE. If the UE fails to detect scheduling or transmission of data over the secondary cell within the duration of the deactivation timer, the UE will deactivate the secondary cell. The base station maintains its parallel timer and, if no data is to be scheduled for the UE during the duration of the timer, it will identify the secondary cell as being deactivated by the UE at expiration of the deactivation timer.

In a second alternative aspect of the present disclosure, the configuration of the deactivation timer may be independent of CCA success. Turning back to FIG. 5B, a functional block diagram illustrates a transmission stream 51 with a series of radio frames 1-X in a communication system configured according to one aspect of the present disclosure. At 503, the UE receives the deactivation timer configuration from the serving base station. In such CCA-independent configurations, the values of deactivation timers for component carriers on unlicensed spectrum are increased to account for uncertainties of channel access. For example, a deactivation timer of 2, 4, 8 radio frames may be too small for channels with several public land mobile networks (PLMNs) and WiFi nodes. If the deactivation timer were configured to a duration of 4 radio frames, as illustrated in the CCA-dependent deactivation timer configuration scheme of FIG. 5A, the timer would expire and the secondary cell would be deactivated before even the first successful CCA has been achieved in frame 18. As such, in the CCA-independent deactivation timer configuration scheme, the durations are selected to be longer when the secondary cell is in unlicensed spectrum.

For example, when an unlicensed spectrum is detected for a particular secondary cell, the deactivation timer is set to an increased timer value (e.g., 16, 32, 64, or 128 radio frames). Thus, when the deactivation timer is configured at 503, the UE detects whether the secondary cell associated with the deactivation timer is in licensed or unlicensed spectrum. If the cell is in unlicensed spectrum, then the UE will select a timer duration from a set of unlicensed duration values, N. The set of unlicensed deactivation timer durations are longer durations (e.g., 16, 32, 64 radio frames, and the like). Once the unlicensed timer duration is selected, the UE reconfigures and initiates the deactivation timer with the longer unlicensed duration. If no downlink transmission is detected within the N radio frames, the UE deactivates the secondary cell. The UE detects a first clear CCA during frame 18, at 505, which is within the 32 radio frame duration that was reconfigured by the UE. If no data is scheduled or transmitted after frame 18 and until frame 32, the UE will deactivate the second cell.

Figures 7A, 7B:
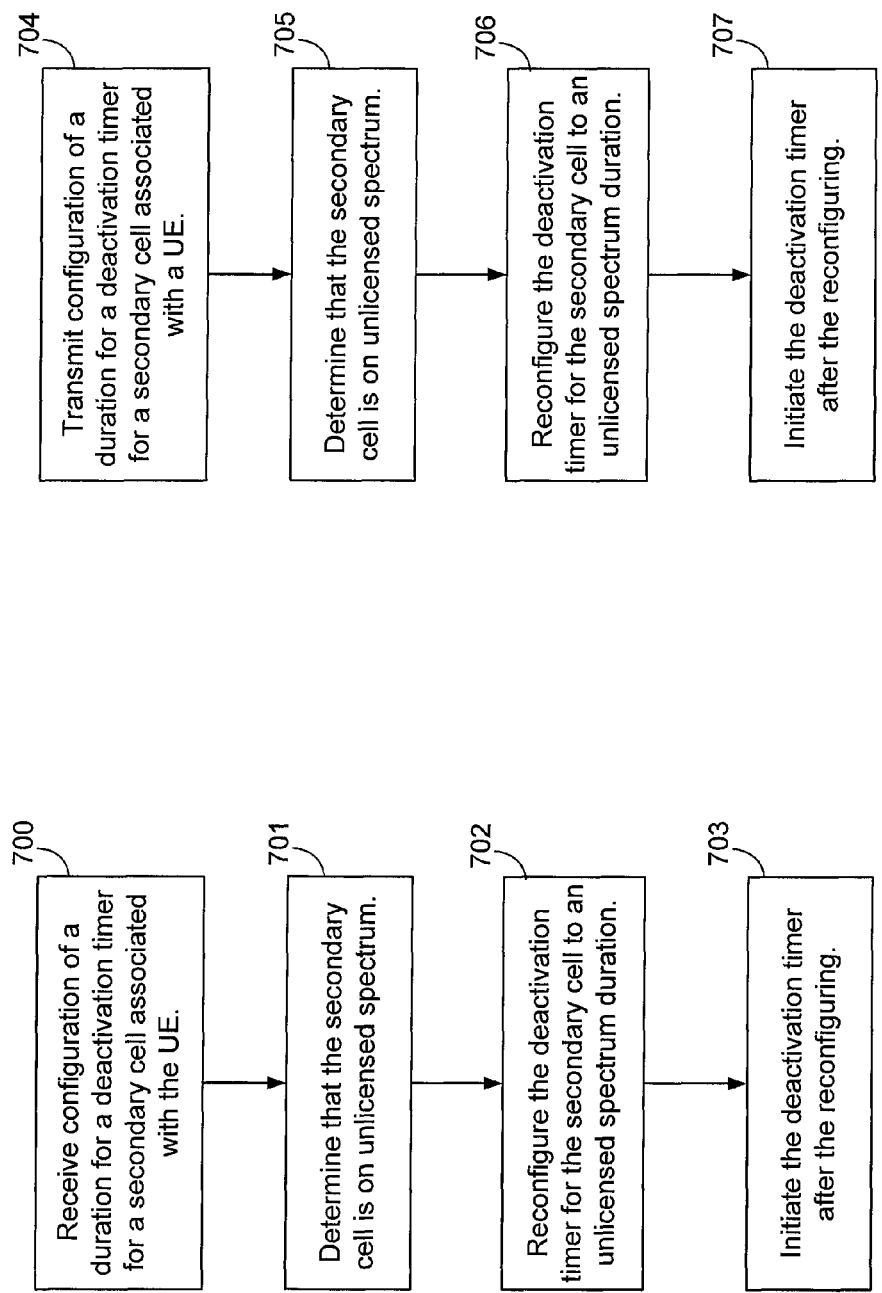
FIGS. 7A and 7B are functional block diagrams illustrating example blocks executed at a UE and base station to implement aspects of the present disclosure.

FIGS. 7A and 7B are functional block diagrams illustrating example blocks executed at a UE and a base station to implement an aspect of the present disclosure. At block 704, a serving base station transmits configuration of a deactivation timer for a secondary cell associated with a UE. At block 700, the UE receives the configuration signal that includes the duration of the deactivation timer. At block 701, the UE determines whether the secondary cell is within licensed spectrum or unlicensed spectrum. At block 702, when the secondary cell is determined to be within unlicensed spectrum, the UE reconfigures the deactivation timer using an unlicensed spectrum duration. The unlicensed spectrum duration may be longer than the shorter duration options (e.g., greater than 16 radio frames). At block 705, the serving base station recognizes that the secondary cell is on unlicensed spectrum and also, at block 706, reconfigures its parallel deactivation timer using the longer unlicensed spectrum duration. At blocks 703 and 707, the UE and serving base station, respectively, then initiate their deactivation timers after reconfiguration to the unlicensed spectrum duration. If no data is received before expiration of the deactivation timer, the UE may deactivate the secondary cell. The serving base station, after expiration of its parallel deactivation timer without any data to schedule for transmission to the UE, will identify the secondary cell as being deactivated by the UE.

In a third alternative aspect of the present disclosure, the choice between the CCA-dependent aspect and the CCA-independent aspect is based on a threshold timer value. For example, if the deactivation timer is configured to a smaller value (e.g., 2, 4, or 8 radio frames), the CCA-dependent timer configuration is used. Thus, the deactivation timer is only started upon detection of a successful CCA (e.g., detecting a channel reserving signal). Otherwise, if the deactivation timer is configured to a larger value (e.g., 16 or more radio frames), the CCA-independent timer configuration is used.

Figures 8A, 8B:
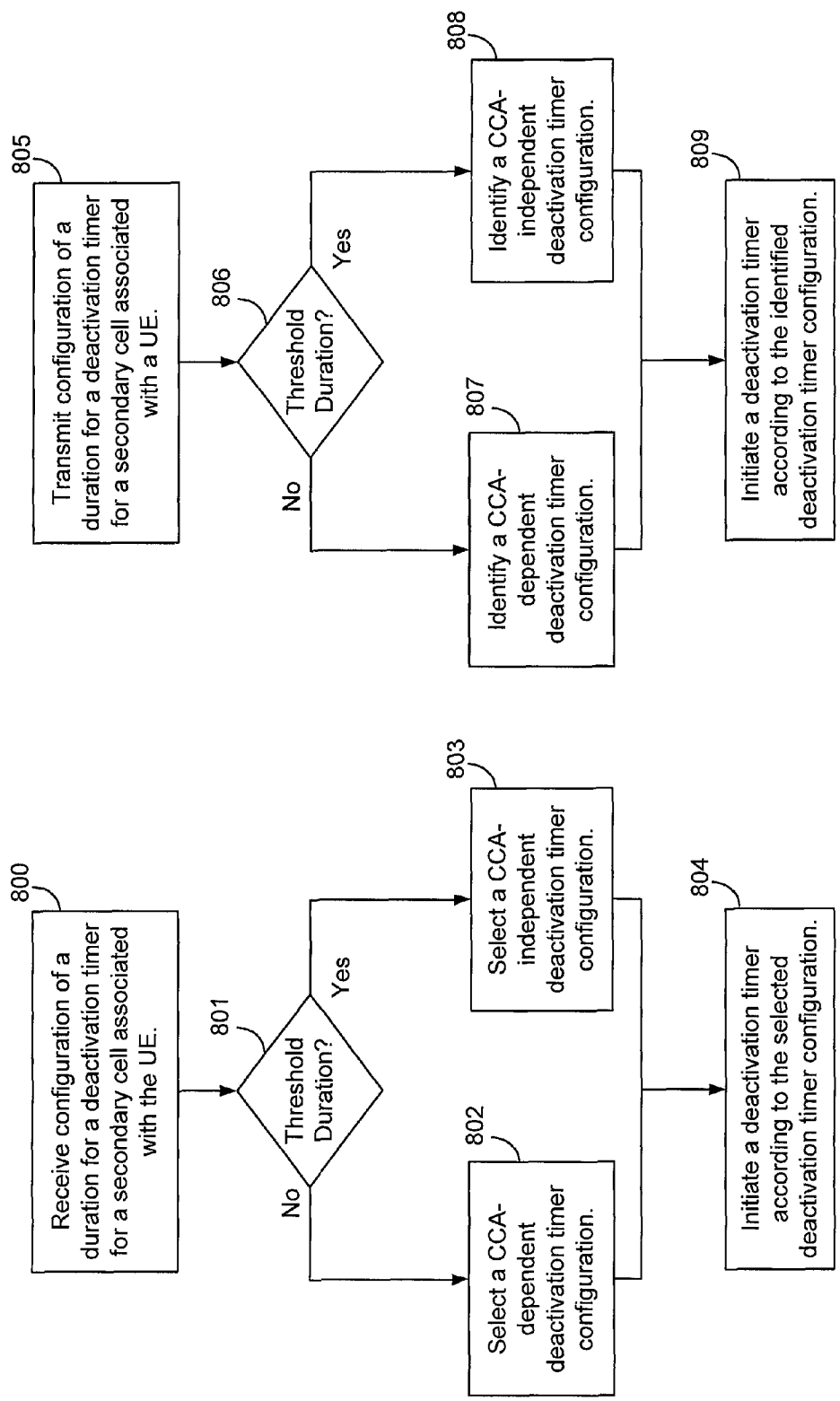
FIGS. 8A and 8B are functional block diagrams illustrating example blocks executed at a UE and base station to implement aspects of the present disclosure.

FIGS. 8A and 8B are functional block diagrams illustrating example blocks executed at a UE and a base station to implement an aspect of the present disclosure. At block 805, a serving base station transmits configuration of a duration for a deactivation timer for a secondary cell associated with a particular UE. At block 800, the UE receives the configuration of the deactivation timer. At block 801, a determination is made by the UE whether the configured duration meets a predetermined threshold length. If the configuration duration is small or a short number of radio frames, then the UE selects a CCA-dependent deactivation timer configuration, at block 802. If the configuration duration is large or a longer number of radio frames, then the UE selects a CCA-independent deactivation timer configuration at block 803. At the base station side, the base station also performs a determination, at block 806, whether the configured duration meets the predetermined threshold. If not, and the duration is smaller, then, at block 807, the base station identifies the CCA-dependent timer configuration for its parallel deactivation timer. If the configured duration is larger, then, at block 808, the base station identifies a CCA-independent deactivation timer configuration for its parallel deactivation timer. At blocks 804 and 809, the UE and serving base station, respectively, initiate their deactivation timers according to the selected or identified deactivation timer configuration.

Figure 5B:
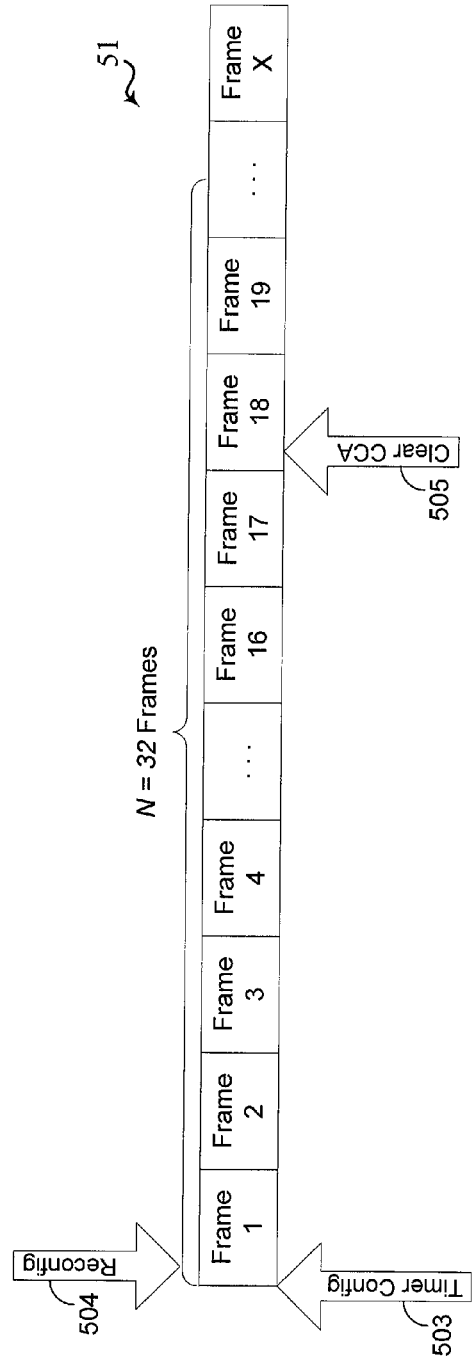
Figures 9A, 9B:
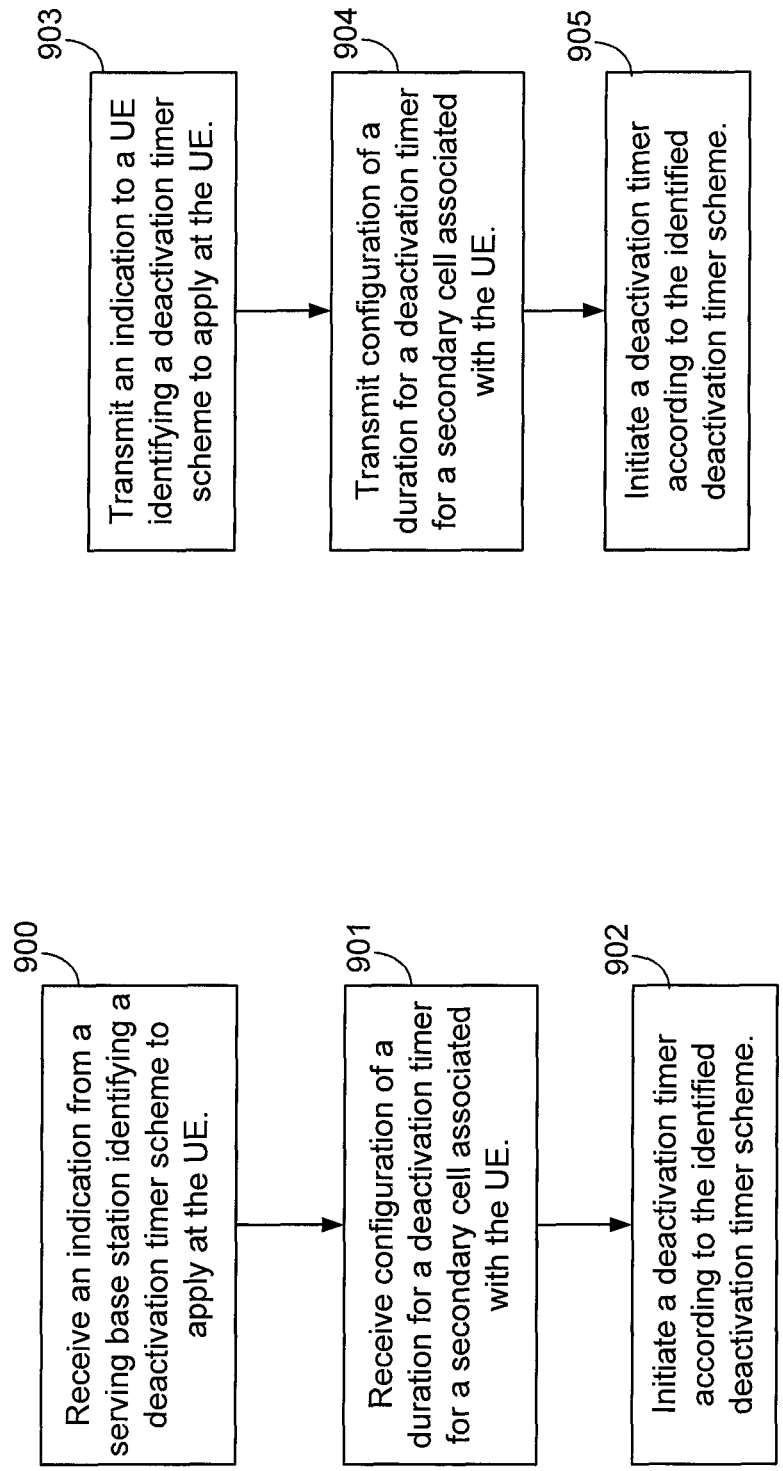
FIGS. 9A and 9B are functional block diagrams illustrating example blocks executed at a UE and base station to implement aspects of the present disclosure.

It should further be noted that, in additional alternative aspects, all three alternative aspects may be supported, in which the base station indicates through an RRC reconfiguration message to the UE which of the alternative aspects is to be used. FIGS. 9A and 9B are functional block diagrams illustrating example blocks executed at a UE and a base station to implement an aspect of the present disclosure. At block 903, a serving base station transmits an indication to a UE that identifies a deactivation timer scheme to apply at the UE. The indication may identify a CCA-dependent deactivation timer configuration, as illustrated in FIGS. 5A, 6A, and 6B, a CCA-independent deactivation timer configuration, as illustrated in FIGS. 5B, 7A, and 7B, or a hybrid CCA-dependent/CCA-independent deactivation timer configuration, as illustrated in FIGS. 8A and 8B. At block 900, the UE receives the indication that identifies which deactivation timer scheme to apply. At block 904, the serving base station transmits configuration of the duration of the deactivation timer for a secondary cell associate with the UE. At block 901, the UE receives the configured duration for the deactivation timer. At blocks 902 and 905, the UE and serving base station, respectively, initiate their deactivation timers according to the identified deactivation timer scheme, as illustrated in FIGS. 5-8.

The various aspects described with respect to the three alternatives above may be applicable to the supplemental downlink mode and standalone mode for LTE/LTE-A networks with unlicensed spectrum. Additional aspects applicable to LTE/LTE-A networks with unlicensed spectrum in carrier aggregation mode may include additional features for dealing with uplink transmission uncertainty. For uplink communications over the secondary cells, the secondary cell may be deactivated using an uplink deactivation timer under specific conditions after a number, M, of radio frames. For example, when the UE is cross-carrier scheduled and cannot access the uplink channel for M radio frames after continuously receiving an uplink grant in each radio frame, the UE may deactivate the secondary cell. Additionally, when the UE is self-scheduled and cannot access the uplink channel for M radio frames after detecting a downlink transmission and receiving an uplink grant, the UE may also deactivate the secondary cell. In addition, the UE may deactivate the secondary cell when no downlink traffic/activity is detected on the secondary cell. It should be noted that, in general, the number of radio frames configured for an uplink deactivation timer, M, does not equal the number of radio frames configured for a downlink deactivation timer, N. When there is a larger amount of downlink traffic, M will typically be small in order to more quickly free resources for the downlink transmissions. Otherwise, M may be close in value to N.

Figure 10:
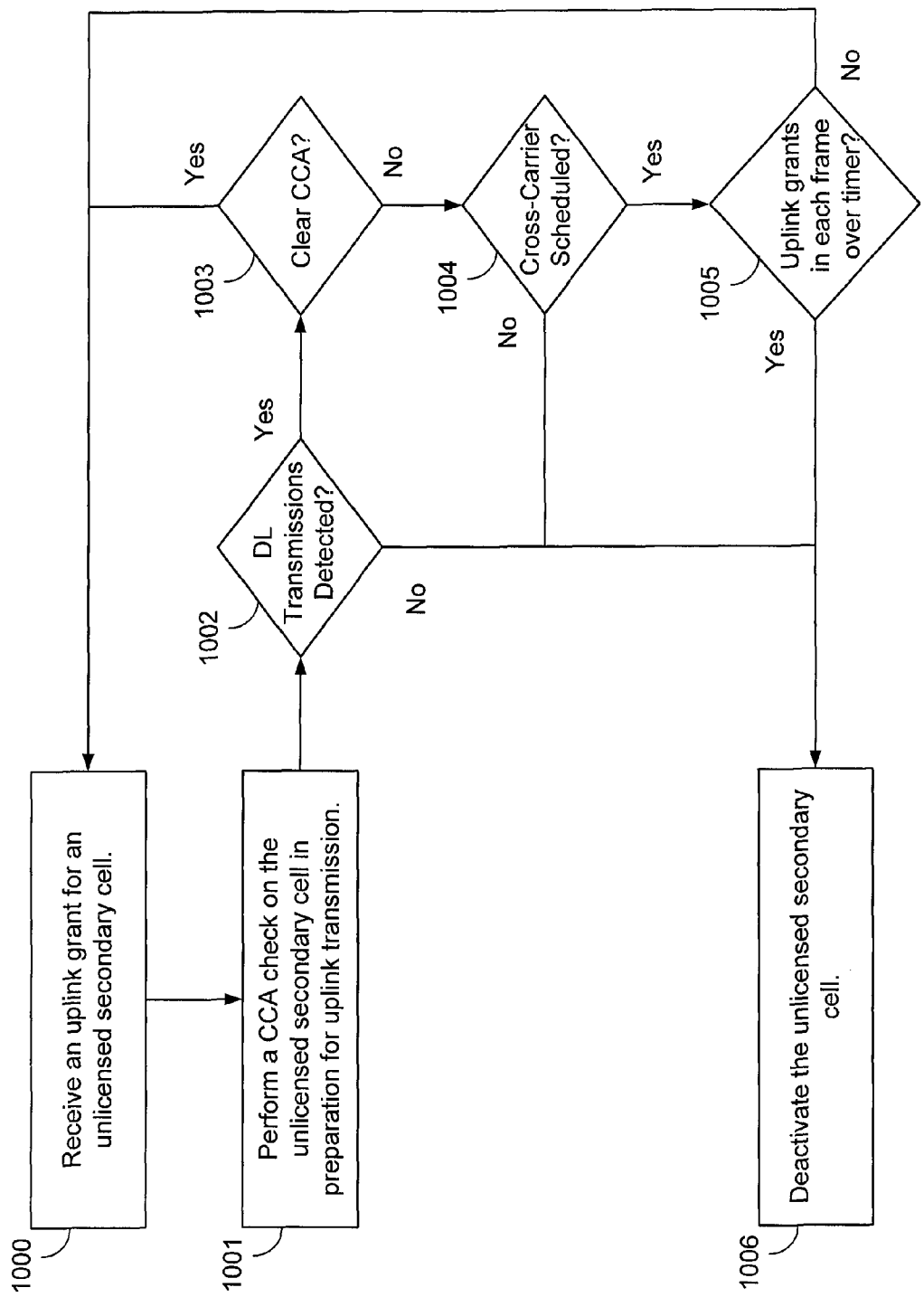
FIG. 10 is a functional block diagram illustrating example blocks executed to implement one aspect of the present disclosure.

FIG. 10 is a functional block diagram illustrating example blocks executed to implement one aspect of the present disclosure. At block 1000, a UE receives an uplink grant for an unlicensed secondary cell. In preparation for uplink transmissions, the UE, at block 1001, performs a CCA check on the unlicensed secondary cell. At block 1002, a determination is made whether downlink transmission are detected on the unlicensed secondary cell. If no downlink transmissions and, thus, no activity is detected on the unlicensed secondary cell, then, at block 1006, the UE deactivates the unlicensed secondary cell. If activity is detected on the unlicensed secondary cell, then another determination is made, at block 1003, whether a clear CCA has been detected. If so, then the UE may perform its uplink transmissions and return to the beginning of the process at block 1000. Otherwise, if no clear CCA has been detected, if, at block 1004, the uplink grant was self-scheduled on the unlicensed secondary carrier, then, at block 1006, the UE deactivates the unlicensed secondary carrier. Otherwise, if the uplink grant was cross-carrier scheduled, then, at block 1005, a determination is made whether an uplink grant has been received in each frame within the duration of the deactivation timer. If not, then, the UE continues the process from block 1000. Otherwise, if an uplink grant has been received in each frame within the duration of the deactivation timer, but the UE has not been able to access the unlicensed secondary cell within the duration, then, at block 1006, the UE deactivates the unlicensed secondary cell.

Additional aspects of the present disclosure provide for handling of downlink CCA-exempt transmissions (CETs). CCA is not necessary for autonomous transmissions subject to various regulatory requirements. These transmissions are referred to as CET and may be scheduled regularly, e.g., every 80 ms, with a duration of a fraction of a subframe. CET may be present in both downlink and uplink transmission and may carry system information and other relevant information (e.g., group power control, etc.) Aspects of the present disclosure provide for using a deactivation timer when a UE fails to correctly decode such downlink CET. For example, if a UE cannot correctly decode downlink CET for M consecutive radio frames, the UE may send a message that the CET cannot be decoded on the particular secondary cell to the base station on the uplink (either licensed or unlicensed uplink of another cell) and then deactivate the cell.

Additional aspects of the present disclosure also provide for handling of uplink CET in LTE/LTE-A networks with unlicensed spectrum in carrier aggregation mode and standalone mode. Similar to the handling of downlink CET, aspects of the present disclosure also provide for using a deactivation timer when a base station fails to correctly decode such uplink CETs. For example, if a base station cannot correctly decode the uplink CET for M consecutive radio frames, the base station may send a message that the CET cannot be decoded to the UE (either licensed or unlicensed downlink of another cell) and then deactivate the cell. It should be noted that when operating in the standalone mode, a primary cell cannot be deactivated.

Figure 11:
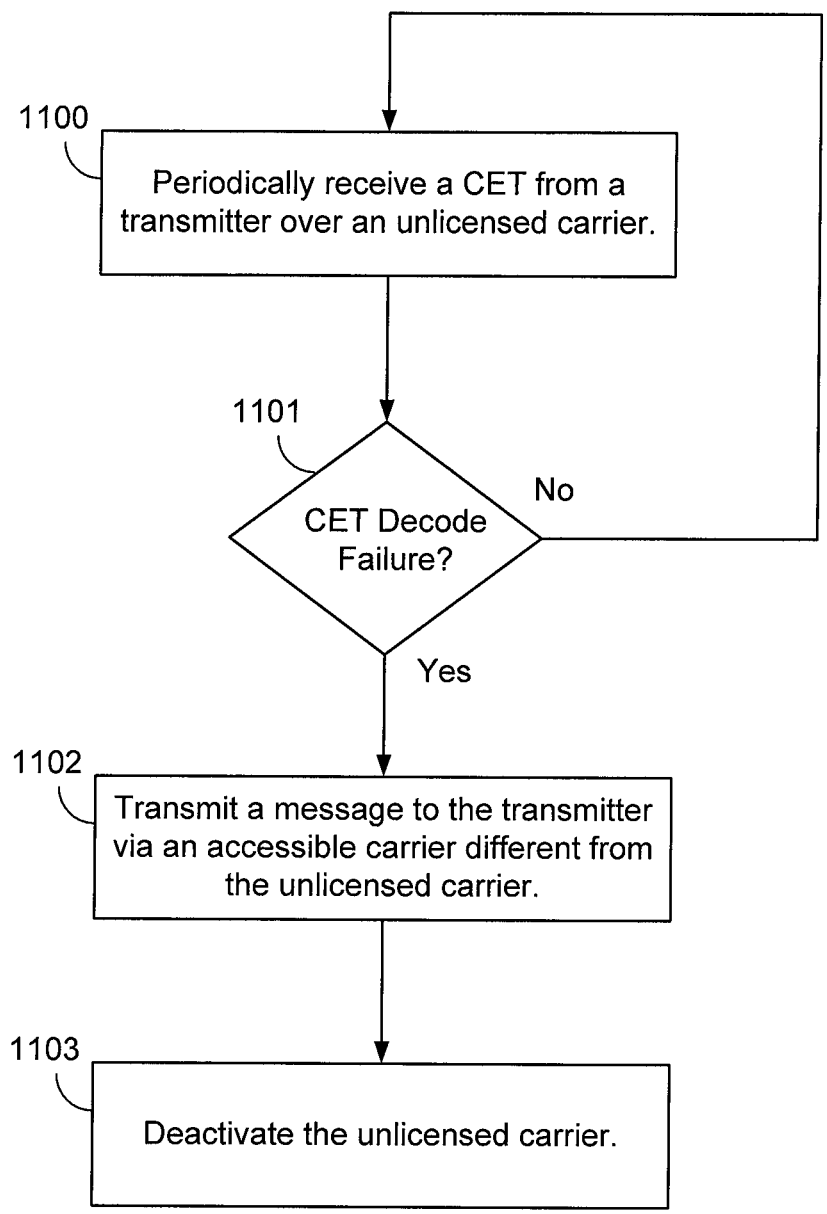
FIG. 11 is a functional block diagram illustrating example blocks executed to implement one aspect of the present disclosure.

FIG. 11 is a functional block diagram illustrating example blocks executed to implement one aspect of the present disclosure in handling CET. At block 1100, a receiver, which may be either a UE, as a receiver, or a base station, as a receiver of UE transmissions, periodically receives CET from a transmitter over an unlicensed carrier. The transmitter may be either a base station, when transmitting downlink data to a UE, or may be a UE, when transmitting uplink data to the base station. CET are transmitted at regularly scheduled intervals, e.g., every 80 ms, if the CET cannot be decoded over a certain number of consecutive transmissions, then the secondary cell over which such CET are transmitted may not be suitable. Accordingly, at block 1101, a determination is made whether CET transmissions have failed to properly be decoded for a predetermined number of consecutive transmissions. If not, and some have been successfully decoded, then the receiver returns to the process at block 1100. Otherwise, if CET have not been successfully decoded for the predetermined number of consecutive transmissions, then, at block 1102, the receiver transmits a message to the transmitter via an accessible carrier that the CETs have not been successfully decoded, and, at block 1103, the receiver deactivates the unlicensed carrier. In order to successfully send the message to the transmitter, at block 1102, the receiver would transmit the message using either a licensed carrier or another unlicensed carrier that is different from the current unlicensed carrier over which the CET are being received.

Figure 13:
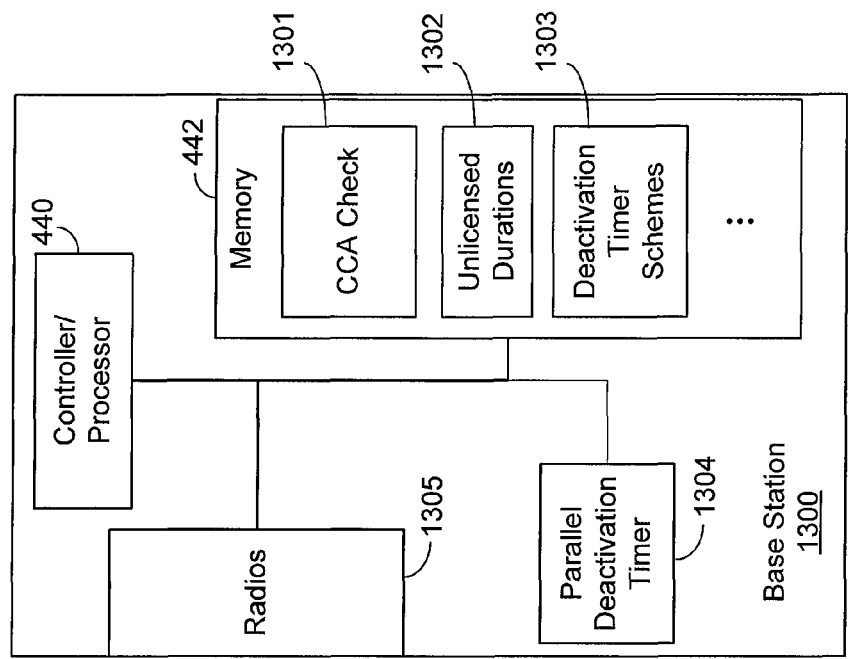
FIG. 13 is a block diagram illustrating components of an eNB configured according to one aspect of the present disclosure.
Figure 12:
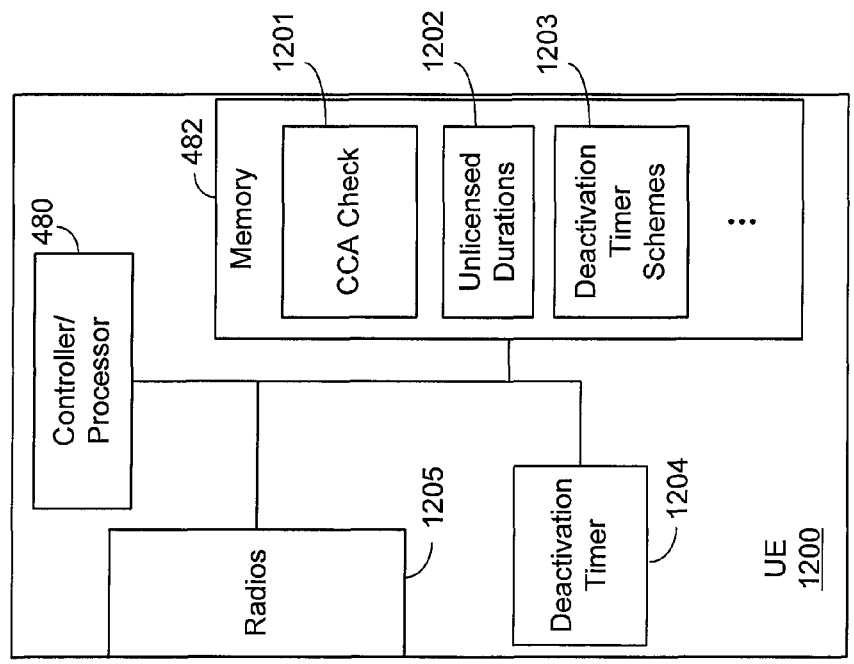
FIG. 12 is a block diagram illustrating components of a UE configured according to one aspect of the present disclosure.

FIGS. 12 and 13 are block diagrams illustrating components of a UE 1200 and a base station 1300 configured according to one aspect of the present disclosure. UE 1200 includes controller/processor 480. Controller/processor 480 includes one or more processors that execute the logic, stored in memory 482, and controls the components and hardware that provides the features and functionality of UE 1200. Similarly, base station 1300 includes controller/processor 440. Controller/processor 440 includes one or more processors that execute the logic, stored in memory 442, and controls the components and hardware that provides the features and functionality of base station 1300. UE 1200 and base station 1300 may execute the processes and procedures and perform the functions over the various aspects as illustrated in FIGS. 5-11, respectively. For example, CCA check modules 1201 and 1301, in memories 482 and 442, respectively, may be executed by controller/processors 480 and 440 to both perform CCA checks for uplink communications over unlicensed carriers and also to detect for successful CCA checks from other serving base stations, for CCA-dependent deactivation timer configuration. Unlicensed durations 1202 and 1302, in memories 482 and 440, may also be used in CCA-independent deactivation timer configurations. When the received durations are below a threshold, UE 1200 may select and base station 1300 may identify a longer duration from unlicensed durations 1202 and 1302. Moreover, each of UE 1200 and base station 1300 may use hybrid CCA-dependent/CCA-independent deactivation timer configurations or selectable operations of all such deactivation timer schemes by maintaining the functionality of the various operations in deactivation timer schemes 1203 and 1303, in memories 482 and 442. In operating the hybrid CCA-dependent/CCA-independent configuration, controller/processors 480 and 440 would compare the configured durations against a threshold to determine whether a CCA-dependent configuration scheme is used for smaller durations or a CCA-independent configuration scheme is used for longer durations. Thus, the various aspects of the present disclosure illustrated in FIGS. 5-11 may be implemented using the features and components of UE 1200 and base station 1300.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6-11 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication, media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving configuration of a duration for a deactivation timer for a secondary cell associated with a user equipment (UE);
   determining whether the secondary cell is configured to operate on a communication spectrum on which access to a channel on the communication spectrum is one of: guaranteed or not guaranteed;
   selecting a deactivation timer duration from the received configuration based on the determining;
   detecting a channel reserving signal over the secondary cell from a serving base station; and
   initiating the deactivation timer having the selected deactivation timer duration in response to the channel reserving signal.

2. The method of claim 1, further including:
   detecting no data scheduled over the duration of the deactivation timer; and
   in response to detecting no data scheduled for the duration, deactivating the secondary cell.

3. The method of claim 2, wherein data includes one or more of:
   control channel data, when downlink grants are received over the secondary cell; and
   data channel data, when downlink grants are received cross-carrier from the secondary cell.

4. A method of wireless communication, comprising:
   transmitting configuration of a duration for a deactivation timer for a secondary cell associated with a user equipment (UE);
   determining whether the secondary cell is configured to operate on a communication spectrum on which access to a channel on the communication spectrum is one of: guaranteed or not guaranteed;
   selecting a deactivation timer duration from the configuration based on the determining;
   detecting a successful clear channel assessment (CCA) check of the secondary cell for transmission to the UE;
   initiating the deactivation timer having the selected deactivation timer duration for the secondary cell, in response to detecting the successful CCA check.

5. The method of claim 4, further including:
   determining no data to schedule for the UE over the secondary cell for the duration of the deactivation timer; and
   in response to determining no data to schedule for the duration, deactivating the secondary cell.

6. The method of claim 5, wherein data includes one or more of:
   control channel data, when downlink grants are transmitted over the secondary cell; and
   data channel data, when downlink grants are transmitted cross-carrier from the secondary cell.

7. A non-transitory computer-readable medium having program code recorded thereon, comprising:
   program code for causing a computer to receive configuration of a duration for a deactivation timer for a secondary cell associated with a user equipment (UE);
   program code for causing the computer to determine whether the secondary cell is configured to operate on a communication spectrum on which access to a channel on the communication spectrum is one of: guaranteed or not guaranteed;
   program code for causing the computer to select a deactivation timer duration from the received configuration based on the determination of whether the secondary cell is configured to operate on a communication spectrum on which access to a channel on the communication spectrum is one of: guaranteed or not guaranteed;
   program code for causing the computer to detect a channel reserving signal over the secondary cell from a serving base station; and
   program code for causing the computer to initiate the deactivation timer having the selected deactivation timer duration in response to the channel reserving signal.

8. The non-transitory computer-readable medium of claim 7, further including:
   program code for causing the computer to detect no data scheduled over the duration of the deactivation timer; and
   program code, executable in response to detecting no data scheduled for the duration, for causing the computer to deactivate the secondary cell.

9. The non-transitory computer-readable medium of claim 8, wherein data includes one or more of:
   control channel data, when downlink grants are received over the secondary cell; and
   data channel data, when downlink grants are received cross-carrier from the secondary cell.

10. An apparatus configured for wireless communication, the apparatus comprising:
    at least one processor; and
    a memory coupled to the at least one processor,
    wherein the at least one processor is configured:
      to receive configuration of a duration for a deactivation timer for a secondary cell associated with a user equipment (UE);
      to determine whether the secondary cell is configured to operate on a communication spectrum on which access to a channel on the communication spectrum is one of: guaranteed or not guaranteed;
      to select a deactivation timer duration from the received configuration based on the determination of whether the secondary cell is configured to operate on a communication spectrum on which access to a channel on the communication spectrum is one of: guaranteed or not guaranteed;

to detect a channel reserving signal over the secondary cell from a serving base station; and to initiate the deactivation timer having the selected deactivation timer duration in response to the channel reserving signal.

11. The apparatus of claim 10, further including configuration of the at least one processor:

to detect no data scheduled over the duration of the deactivation timer; and to deactivate the secondary cell in response to detecting no data scheduled for the duration.

12. The apparatus of claim 11, wherein data includes one or more of:

control channel data, when downlink grants are received over the secondary cell; and data channel data, when downlink grants are received cross-carrier from the secondary cell.

13. The method of claim 1, wherein the deactivation timer duration selected when the secondary cell is configured to operate on the communication spectrum on which access to the channel on the communication spectrum is guaranteed is shorter than the deactivation timer duration selected when the secondary cell is configured to operate on the communication spectrum on which access to the channel on the communication spectrum is not guaranteed.

14. The method of claim 4, wherein the deactivation timer duration selected when the secondary cell is configured to operate on the communication spectrum on which access to the channel on the communication spectrum is guaranteed is shorter than the deactivation timer duration selected when the secondary cell is configured to operate on the communication spectrum on which access to the channel on the communication spectrum is not guaranteed.

15. The non-transitory computer-readable medium of claim 7, wherein the deactivation timer duration selected when the secondary cell is configured to operate on the communication spectrum on which access to the channel on the communication spectrum is guaranteed is shorter than the deactivation timer duration selected when the secondary cell is configured to operate on the communication spectrum on which access to the channel on the communication spectrum is not guaranteed.

16. The apparatus of claim 10, wherein the deactivation timer duration selected when the secondary cell is configured to operate on the communication spectrum on which access to the channel on the communication spectrum is guaranteed is shorter than the deactivation timer duration selected when the secondary cell is configured to operate on the communication spectrum on which access to the channel on the communication spectrum is not guaranteed.

* * * * *